Aug. 10, 1926.

J. G. COFFIN

TESTING APPLIANCE

Filed Jan. 11, 1924

1,595,225

INVENTOR
JOSEPH G. COFFIN
BY
*Ernest T Hopkinson*
HIS ATTORNEY

Patented Aug. 10, 1926.

1,595,225

UNITED STATES PATENT OFFICE.

JOSEPH G. COFFIN, OF HEMPSTEAD, NEW YORK, ASSIGNOR TO MORGAN & WRIGHT, OF DETROIT, MICHIGAN, A CORPORATION OF MICHIGAN.

TESTING APPLIANCE.

Application filed January 11, 1924. Serial No. 685,508.

This invention relates to test appliances, and more particularly, one suited for obtaining an accurate record or measurement of the impacts or accelerations of moving bodies, such as automobiles.

It is frequently desirable to ascertain accurately the riding qualities of vehicles, such as trucks, passenger automobiles, railroad coaches and the like, or the change in their riding comfort effected by the many factors involved, such as the internal pressure, construction and tread design of tires, springs, shackles, type of suspension, cushions or seats, etc. The riding comfort is determined, at least largely, by accelerations, and by the frequency of the accelerations. An occupant of an automobile, for instance, may be subjected to either, or both, linear or rotational movement. Both of these affect his comfort.

The present invention aims to provide an appliance for measuring, and, if desired, recording the measurements of impacts or accelerations. More especially, it aims to provide a type of such an instrument which will measure linear accelerations (i. e., the algebraic sum of both true right-line and the right-line component of angular motion) to the exclusion of rotational acceleration, or vice versa. In other words, and with a specific application of the invention in mind, it aims to provide an appliance of the type mentioned, which will record all of the forces contributing to an impact that occasions discomfort, eliminating a rotational component that presumably does not occasion discomfort, or vice versa. The invention also aims to provide a means for damping vibrations and thereby permitting a record or graph to be made which is not so difficult to read.

With the illustrated embodiment in mind and without intention to limit more than is required by the prior art, the invention may be described, briefly, as a closed, frictionless, hydraulic system, comprising a "sylphon," non-expansible conduit and Bourdon tube, in combination with, a lever, or levers, having weighted free extremities and having operative (or thrust) connection with the "sylphon" for developing pressures within the hydraulic system in proportion to the accelerations to which the free weighted end of the lever or levers is subjected.

A preferred embodiment of the invention is shown in the accompanying drawings, in which:—

Figure 1:
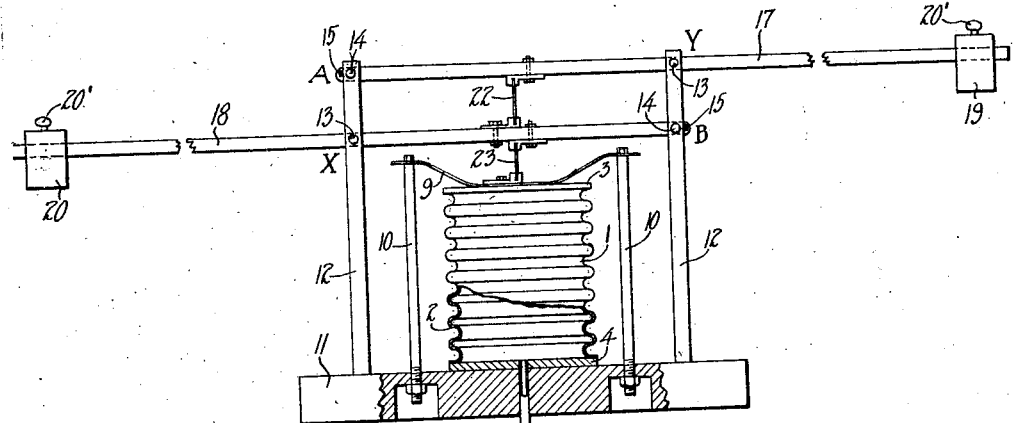
Figure 2:
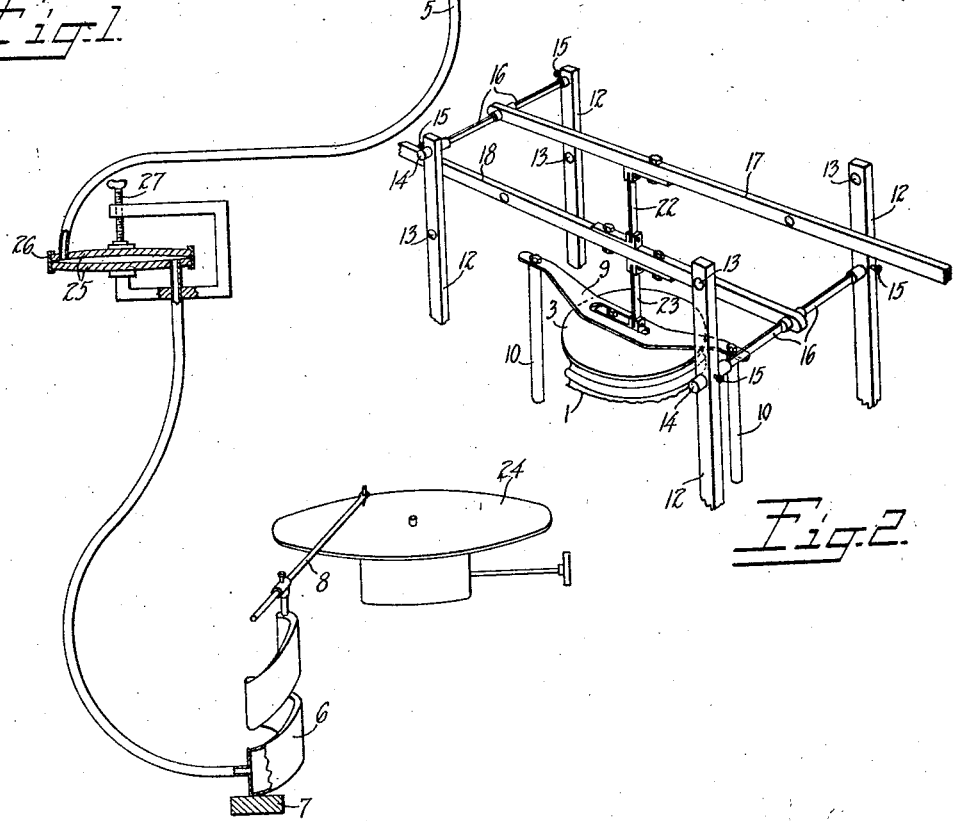

Figure 1 is a diagrammatic elevation of the appliance, parts thereof being shown in section for clearness of illustration;

And Figure 2 is a fragmentary perspective, better illustrating details of the appliance.

The closed elastic frictionless hydraulic system (as more fully described in pending application Serial No. 585,612, filed September 1st, 1922, now Patent 1,561,970 of which this application is a continuation-in-part) comprises a container, indicated generally at 1, having longitudinally collapsible and peripherally inextensible side walls 2, preferably, but not necessarily, made of corrugated copper, and rigid end walls 3 and 4, which are connected to the side walls in a liquid-tight manner; a conduit 5, which is inexpansible within the range of pressure employed in the appliance; and a coiled hollow tube 6, highly resistant to volumetric change, anchored at one extremity, as diagrammatically illustrated at 7, and having a stylus 8, at its opposite free extremity, which is adapted to move as the pressure within the system varies across a chart or record sheet of any suitable construction.

To put the hydraulic system under an initial pressure, as is desirable, but not essential, a spring 9 may be employed to bear down upon the upper free end 3 of the container, the force applied by the spring being variable as desired, for instance by bolts 10, which are adjustably secured to a base-plate 11 on which the container 1 rests and may have its end wall 4 fixed.

In co-operative relation with the container 1, one or more levers, having weighted free extremities and of any suitable length, may be located and supported in any suitable and convenient manner. As shown in the drawings and preferably, the base-plate 11 is equipped with four uprights or standards 12 provided with apertures 13, see Figure 2, for the reception of fulcrum pins 14, which may be set-screwed in place, as indicated at 15. Each fulcrum pin 14 is preferably machined off to form blade-like portions 16, which may be located so as to be relatively rigid in the direction of extent of the uprights 12, but substantially non-resistant to torsion, which is theoretically necessary to provide but practically almost negligible. Levers 17 and 18 are suitably apertured so that the fulcrum pins 14 may be inserted either in their ends or intermediately, as desired.

The opposite ends of the levers 17 and 18, which are free, are weighted, as indicated at 19 and 20, and these weights are preferably provided with clamp-screws 20′ for holding them in any adjusted position. At a distance a little in from the end of each lever, flexible operative connections 22 and 23 are provided, preferably in the form of a blade of spring metal, such as steel, the former, 22, being permanently anchored at its opposite ends to and between each of the levers, and the latter, 23, being preferably anchored to and between the lever 18 and the rigid end wall 3 of the container 1.

The flexible connection 23 passes loosely through the aforementioned spring 9, so that the latter does not alter the transmission of the forces through to the container 1 from the weighted levers 17 and 18. The flexible connections 22 and 23 permit each of the levers 17 and 18 to move freely (in the arcuate path theoretically necessary) about their fulcrums at either side of the container 1 (which is known in the trade as a "sylphon").

As the system is elastic, an impact to which a vehicle is subjected may tend to set up vibrations in the appliance or instrument and these it is desirable to dampen so that the record or graph 24 may be read or interpreted more readily. To this end, "in series" with the conduit 5 is a short drum or hollow cylinder composed of slightly dished steel disks 25 secured marginally in a fluid-tight manner by a band 26. In the drawings, the disks 25 are illustrated diagrammatically in widely separated relation for the sake of illustration, but in actual practice, the disks 25 are arranged almost in contact. Each of these disks is slightly arched at the center so that they may be approached to decrease the space between them and increase the resistance of the liquid to flow. For effecting relative movement of the disks 25, any suitable means may be employed, such as the screw-clamp indicated at 27. By approaching the disks 25, the damping action is increased, and by separating them slightly, the damping action is decreased.

Referring to Figure 1, let the letters A, B, X, Y, designate the four possible fulcrums for the two levers in the specific embodiment of the invention which has been described above. If fulcrum pins 14 are inserted at the points A and B, the appliance will record not only pure right-line linear accelerations of the weights 19 and 20 (as ampified by their lever-arm ratios which are, preferably, in all cases made equal to each other), but also algebraically added thereto the linear components only of any rotation about any axis perpendicular to the plane of the sheet of drawings. In other words, with the fulcrums at A and B, forces are transmitted through the levers 17 and 18 so as to be added together by displacements of both of the weights 19 and 20 in the same direction. If one weight is moved up and the other down, however, (amplifying lever-arm ratios being the same) the forces transmitted through the levers 17 and 18 are opposed and neutralized. Therefore, when levers 17 and 18 are fulcrumed at A and B (or at X and Y, respectively), the total linear acceleration is recorded and rotational acceleration is eliminated or sifted out.

If, however, the levers 17 and 18 are fulcrumed at A and X, respectively, (or at B and Y, respectively), the linear accelerations, which are transmitted through the flexible connections 22 and 23 are opposite to each other and hence, are not recorded as the pressure on the liquid within the container 1 is not varied. The instrument, as thus adjusted, records only rotational accelerations and excludes from record, or measurement, linear accelerations. The operation of the damping appliance has already been explained.

It will be obvious that one of the levers may be omitted if the vehicle or body whose accelerations are to be ascertained is displaced (wholly or largely) in one direction, or more broadly, at right angles to the extent of the lever-arm and in the plane determined by the lever-arm and the axis of the container 1. It will be obvious also that two of these appliances with single levers might be mounted on a vehicle so that the axes of the two containers 1 extend at right angles to each other. Thus, simultaneously, linear accelerations in two directions might be separately measured and recorded. These and many alterations and adaptations may be made in the appliance without departure from the invention in its broadest aspects and are intended to be comprehended in the claims to which reference should be made for an understanding of the scope of the invention.

Having thus described my invention, what I claim and desire to protect by Letters Patent is:—

1. The combination with a closed frictionless hydraulic system comprising a container with longitudinally collapsible peripherally inextensible side walls and rigid end walls connected liquid-tight to the side walls, a non-expansible conduit, and a curled elastic tube highly resistant to volumetric change, the system being filled with fluid, of a free weighted extremity of a lever with a fulcrumed adjacent the container and having an operative connection with a rigid end wall of the container whereby energy from the lever is transmitted to the tube.

2. The combination with a closed frictionless hydraulic system comprising a container with longitudinally collapsible peripherally inextensible side walls and rigid end walls connected liquid-tight to the sidewalls, a non-expansible conduit, and a curled elastic tube highly resistant to volumetric change, the system being filled with fluid, of a pair of levers each having a free weighted extremity fulcrumed adjacent the container and having an operative connection with a rigid end wall of the container whereby energy from the lever is transmitted to the tube.

3. The combination with a closed frictionless hydraulic system comprising a container with longitudinally collapsible peripherally inextensible side walls and rigid end walls connected liquid-tight to the side walls, a non-expansible conduit, and a curled elastic tube highly resistant to volumetric change, of a pair of levers having weighted free extremities, means pivotally supporting said levers adjacent said container, operative connections between said levers and a rigid end wall of said container, and means for arranging the levers so as to join or oppose as desired the forces applied by each to the liquid within the system as desired whereby linear accelerations may be recorded and rotational accelerations eliminated, or vice versa.

4. The combination with a closed frictionless hydraulic system comprising a container with longitudinally collapsible peripherally inextensible side walls and rigid end walls connected liquid-tight to the side walls, a non-expansible conduit, and a curled elastic tube highly resistant to volumetric change, of a pair of levers having weighted free extremities, means for pivotally supporting said levers on the same or opposite sides of said container, and operative connections between said levers and a rigid end wall of said container whereby linear or rotational accelerations may be recorded.

5. The combination with a closed frictionless hydraulic system comprising a container with longitudinally collapsible peripherally inextensible side walls and rigid end walls connected liquid-tight to the side walls, a non-expansible conduit, and a curled elastic tube highly resistant to volumetric change, the system containing liquid, of means for causing flow of the liquid and a damping device in communication with the non-expansible conduit for varying the resistance of the liquid to flow.

6. The combination with a closed frictionless hydraulic system comprising a container with longitudinally collapsible peripherally inextensible side walls and rigid end walls connected liquid-tight to the side walls, a non-expansible conduit, and a curled elastic tube highly resistant to volumetric change, the system containing fluid, of means for causing flow of the fluid and a damping device connected to the system operative upon the fluid which comprises close-lying spring disks hermetically joined marginally, and means for varying the distance between the disks.

7. The combination with a closed frictionless hydraulic system comprising a container with longitudinally collapsible peripherally inextensible side walls and rigid end walls connected liquid-tight to the side walls, a nonexpansible conduit, and a curled elastic tube highly resistant to volumetric change, the system being filled with fluid, of recording means connected to the system and selective means operative upon the container to actuate the recording means through pressure applied to the fluid whereby various accelerations may be recorded.

8. The combination with a closed frictionless hydraulic system comprising a container with longitudinally collapsible peripherally inextensible side walls and rigid end walls connected liquid-tight to the side walls, a nonexpansible conduit, and a curled elastic tube highly resistant to volumetric change, the system being filled with fluid, of recording means connected to the system and selective means operative upon the container to actuate the recording means through pressure applied to the fluid, the selective means being adjustable to exclude some accelerations whereby other accelerations may be recorded.

9. The combination with a closed frictionless hydraulic system comprising a container with longitudinally collapsible peripherally inextensible side walls and rigid end walls connected liquid-tight to the side walls, a nonexpansible conduit, and a curled elastic tube highly resistant to volumetric change, the system being filled with fluid, of recording means connected to the system, means for putting the system under initial pressure, and selective means operative upon the system to actuate the recording means through pressure applied to the fluid whereby various accelerations may be recorded.

Signed at New York city, county of New York, State of New York, this 5th day of January, 1924.

JOSEPH G. COFFIN.